Patented Nov. 8, 1938

2,136,178

UNITED STATES PATENT OFFICE 2,136,178

ALIPHATIC UNSATURATED COMPOUNDS AND THE PROCESS OF PREPARING THEM

Wallace H. Carothers and Gerard J. Berchet, Wilmington, Del., assignors to E. I. du Pont de Nemours & Company, Wilmington, Del., a corporation of Delaware No Drawing. Application March 6, 1937, Serial No. 129,469

9 Claims. (Cl. 260—609)

This invention relates to new chemical compounds and to the process of preparing the same. The invention further pertains to reactions involving halogen-4-butadiene-1, 2 and alkali and alkali earth metal inorganic compounds and the products derived from such reactions.

This case is a continuation-in-part of applicants' copending application Serial No. 640,326, filed October 29, 1932, which has now matured into U. S. Patent No. 2,073,363 issued March 9, 1937.

It has been disclosed in a patent to Carothers and Collins, 1,950,431, patented March 13, 1934, that the reaction between monovinylacetylene and hydrogen chloride, under certain conditions, yields substantial quantities of chloro-4-butadiene-1, 2 ($CH_2=C=CH-CH_2Cl$), a new compound, which may be obtained in pure form by fractional distillation. One method of producing chloro-4-butadiene-1, 2 is illustrated in the following example:

EXAMPLE A

In each of 20 bottles were placed 175 g. of concentrated hydrochloric acid, 25 g. of calcium chloride and 50 g. of monovinylacetylene. The bottles were closed and shaken continuously for 5 hours, the supernatant oily layers were drawn off and combined, washed with water, stabilized with pyrogallol, dried with anhydrous calcium chloride, and distilled thru a long column. The fractions collected were: (1) 74 g. at 30–35° C., (2) 222 g. at 50–75° C., (3) 576 g. at 85–95° C., (4) 77 g. at 95–120° C., and (5) 125 g. residue. Fraction (3) was chiefly chloro-4-butadiene-1, 2. On redistillation it yielded 446 g. of pure product.

This compound has a boiling point of 86–88° C., a refractive index of about 1.477 at 20° C. and specific gravity of about 0.991 at 20° C.

It has now been found that this compound contains its chlorine atom in rather loose combination and hence is capable of undergoing many reactions in which chlorine is replaced by other groups with the formation of new and valuable compounds.

One object of the invention pertains to the preparation of novel 4-butadienyl derivatives. Another object pertains to reactions involving halogen-4-butadiene-1, 2 and alkali and alkaline earth metal inorganic compounds and the products derived from such reactions. A further object relates to reacting chloro-4-butadiene-1, 2 with alkaline reacting metal inorganic compounds of the group consisting of alkali metal carbonates, alkaline earth metal carbonates, alkali metal oxides, alkaline earth metal oxides, alkali metal hydrosulphides, alkaline earth metal hydrosulphides, alkali metal hydroxides, and alkaline earth metal hydroxides These reactions and the products obtained thereby are illustrated in the following examples. It is to be understood that the methods of preparation can be varied over wide limits and the examples recorded below are merely by way of illustration.

EXAMPLE 1

*Preparation of hydroxy-4-butadiene-1, 2*

A solution of 636 g. of sodium carbonate in 1500 g. of water is heated at 60–90° C., with 531 g. of chloro-4-butadiene-1, 2 with constant stirring for 15 hours. During the reaction sodium chloride crystallizes from the water. At the end of the reaction the water insoluble layer which contains most of the hydroxy compound is separated from the water layer and dried with anhydrous sodium sulphate. A further quantity may be obtained by extracting the water layer and the precipitated sodium chloride with ether. The product may be purified by fractional distillation, the portion boiling from 68–70° C. at 53 mm. pressure being substantially pure hydroxy-4-butadiene-1, 2. An appreciable amount of higher boiling material and also traces of vinylacetylene are formed in the reaction. If a caustic alkali such as sodium hydroxide is used in place of the sodium carbonate, the proportion of these by-products is increased.

Hydroxy-4-butadiene-1, 2 is a colorless liquid which boils at 126–8° C. at 756 mm. pressure. At 20° C it has a density of 0.918 and a refractive index of 1.4759 for the sodium line of the spectrum. It is quite soluble in water and very soluble in the common organic solvents. It has a powerful vesicant action on the skin and its vapor has a strongly irritating effect upon the mucous membranes. It shows a tendency to polymerize when heated. It is readily hydrogenated by means of a platinum oxide catalyst to normal butyl alcohol, and is converted by boiling with strong hydrochloric acid into the original chloro-4-butadiene 1, 2. If cuprous chloride is present during the latter reaction, the isomeric chloride-2-butadiene-1, 3 results.

Other alkali metal carbonates, e. g., potassium carbonate, may be used in the above example in place of the sodium carbonate. The alkaline earth oxides, hydroxides and carbonates, e. g. CaO, MgO, Ca(OH)$_2$, Mg(OH)$_2$, CaCO$_3$, MgCO$_3$, etc. may also be used. Alkali oxides and hydroxides may also be used, although they produce increase in by-product.

While the hydrolysis of chloro-4-butadiene-1, 2 is preferably carried out in the presence of an alkaline reagent, substantial hydrolysis takes place by merely heating chloro-4-butadiene-1, 2 with water, the yields however being considerably lower than when an alkali metal carbonate is present.

*Methoxy-4-butadiene-1, 2*

One mole of hydroxy-4-butadiene-1, 2 is placed in a flask provided with a stirrer and reflux condenser. Dimethyl sulphate and 50% aqueous sodium hydroxide are added to the stirred mixture at such a rate that the mixture remains constantly alkaline while its temperature does not rise above 60° C After about 2 mols of dimethyl sulphate has been added the mixture is stirred and heated to boiling for about one hour. The methyl ether of hydroxy-4-butadiene-1, 2 is then separated, dried, and distilled. It is a colorless liquid boiling at 87° C. to 89° C. and having a density at 20° C. of about 0.845 and a refractive index for the sodium line of 1.435. It is readily hydrogenated under conventional hydrogenation conditions to methyl n-butyl ether.

Corresponding aliphatic ethers such as the ethyl, propyl, and butyl and higher alkyl ethers can be prepared quite readily in the same way. Preferred alkylating agents are alkyl esters of strong inorganic acids, particularly the alkyl sulphates, e. g., dimethyl sulphate, diethyl sulphate, etc., and alkyl halides, e. g., methyl chloride, ethyl chloride, methyl iodide, ethyl iodide, etc.

Aromatic ethers of hydroxy-4-butadiene-1,2 may be made by treatment of chloro-4-butadiene-1,2 with metallic phenolates.

*Chlorocarbonic ester of hydroxy-4-butadiene-1,2*

Slightly less than one mole of hydroxy-4-butadiene-1,2 is added to one mole of liquid phosgene at about −15° C. It is warmed gently to remove dissolved CHl and excess phosgene. The black residue is washed with cold water, dried, and distilled. The chlorocarbonate,

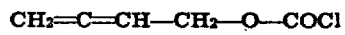

$CH_2=C=CH-CH_2-O-COCl$ is obtained as a colorless liquid boiling at 66 to 68° C. at 57 mm. Its density is about 1.147 and its refractive index for the sodium line is about 1.465, both measured at 20° C. The yield is 60 to 70% of the theory.

The chlorocarbonate may also be obtained by passing gaseous phosgene into the cold liquid hydroxy-4-butadiene-1,2 until the calculated amount has been absorbed.

The chlorocarbonate described above is a convenient source for the preparation of urethanes containing the butadienyl radical $(CH_2=C=CH-CH_2-)$ For example, a 15% solution of the chlorocarbonate in benzene is treated with a stream of dry ammonia, until the gas is no longer completely absorbed. The precipitated ammonium chloride is filtered off and the filtrate is evaporated in vacuo. The crystalline residue is recrystallized from a mixture of benzene and petroleum ether. The pure butadienyl urethane, $CH_2=C=CH-CH_2-O-CO-NH_2$, is thus obtained in the form of white crystals melting at 41 to 41.5° C. (copper block).

In a similar manner by treating the chlorcarbonate with dimethylamine and with methyl aniline, respectively the urethanes described below are obtained:

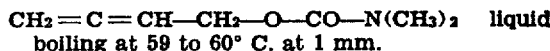
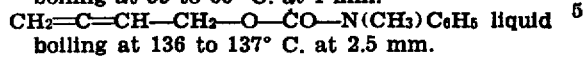

$CH_2=C=CH-CH_2-O-CO-N(CH_3)_2$ liquid boiling at 59 to 60° C. at 1 mm.

$CH_2=C=CH-CH_2-O-CO-N(CH_3)C_6H_5$ liquid boiling at 136 to 137° C. at 2.5 mm.

The urethanes described above are useful compounds for medicinal purposes. Other compounds of this class may be obtained by treating hydroxy-4-butadiene-1,2 with alkyl or aryl isocyanates. Thus, one part of hydroxy-4-butadiene-1,2 is treated with an equivalent amount of α-naphthyl isocyanate. A vigorous reaction occurs, and the mixture on being cooled sets to a solid crystalline mass. After being crystallized from benzene the urethane,

$CH_2=C=CH-CH_2-O-CO-NHC_{10}H_7$ is obtained in the form of small white crystals melting sharply at 117° C.

The chlorocarbonate described above may also be used for the preparation of esters of the general formula $CH_2=C=CH-CH_2-O-CO-OR$. For this purpose the chlorocarbonate is treated with the alcohol or phenol corresponding to the ester desired. Substituted alcohols and phenols may be used in this process, e. g. aminophenols.

Inorganic esters of hydroxy-4-butadiene-1,2 may be prepared either from the chloro-4-butadiene-1,2 or from the alcohol itself. The preparation of the chloride (chloro-4-butadiene-1,2) by the action of concentrated hydrochloric acid on hydroxy-4-butadiene-1,2 has already been mentioned in the paragraph following Example 1. The same product may be obtained by the action of phosphorous trichloride in pyridine solution.

*Isomerization of hydroxy-4-butadiene-1,2*

A solution of 2 g. of sodium in 138 g. of hydroxy-4-butadiene-1,2 is gently refluxed for 8 hours. Distillation furnishes an important fraction consisting of propargyl carbinol,

$HC{\equiv}C-CH_2CH_2OH$.

Propargyl carbinol is already described in the literature (C. R. 146, 1035 (1908); Ann. Chim. (8), 27, 162 (1912)). It boils at about 136° C. at 761 mm. and has the specific gravity $D_4^{20}\ 0.9315$.

It gives a triodo derivative,

$I_2C=CI-CH_2-CH_2-OH$ melting at 114° C. In addition to propargyl carbinol there is obtained a considerable amount of the isomeric alcohol hydroxy-4-butine-2, $CH_3{-}C{\equiv}C-CH_2OH$, boiling at about 139° C. at 761 mm. There is also some syrupy resin produced.

*Dehydration of hydroxy-4-butadiene-1,2*

Fifty-eight grams of hydroxy-4-butadiene-1,2 is passed in an atmosphere of nitrogen over 100 cc. of granular basic aluminum sulfate during 2 hours at 250° C. From the condensate there is obtained 37 g. of unchanged carbinol and 8 g. of vinyl-acetylene, $HC{\equiv}C-CH=CH_2$.

EXAMPLE 2

*Butadienyl mercaptan and butadienyl sulfide*

A solution of 180 g. of potassium hydroxide in 100 cc. of alcohol is saturated with hydrogen sulfide. Two mols (177 g.) of chloro-4-butadiene- 1,2 are then added with mechanical stirring while a slow stream of hydrogen sulfide is passed through the solution. The reaction evolves considerable heat. After addition of all the chloro compound, the mixture is stirred for 1½ hour, then filtered and the filtrate treated with 2000 cc. of water. The oil which separates at the bottom is decanted and treated with a 20% solution of sodium hydroxide (2 mols). The alkaline solution is washed with ether to remove the insoluble material, then acidified with 15% sulfuric acid and the resulting solution is again extracted with ether. This latter etheral solution contains the mercaptan with a large amount of undistillable material. Butadienyl mercaptan, $CH_2=C=CH-CH_2SH$, boils at 53° C. at 90 mm.

$N_D^{20}$ 1.5482, $D_4^{20}$ 0.9754.

The yield is about 30% of the theory.

The material insoluble in alkali gives on distillation butadienyl sulfide,

a liquid boiling at 72–74° C. at 5 mm.

$N_D^{20}$ 1.5561, $D_4^{20}$ 0.9553.

This is obtained in 11% yield. Butadienyl mercaptan reacts readily with mercuric oxide to give the mercury derivative, $(CH_2=C=CH-CH_2S)_2Hg$, white crystals (from alcohol) melting at 70° C. Alkali and alkaline earth hydroxides may be substituted for the potassium hydroxide in the above example.

EXAMPLE 3

When chloro-4-butadiene-1,2 is treated with strong caustic alkalies such as potassium hydroxide, sodium hydroxide, etc., in the dry state or in aqueous or alcoholic solution, the principal reaction consists in the elimination of hydrogen chloride with the formation of vinylacetylene. At the same time appreciable amounts of a higher boiling, very poisonous, and readily polymerizable hydrocarbon are formed. This hydrocarbon is believed to be butatriene,

This is illustrated by the following example:

One mol of chloro-4-butadiene-1,2 is added to 2 mols of powdered potassium hydroxide and the mixture is gently heated until a vigorous reaction sets in. The distillate which collects in the thoroughly cooled receiver is redistilled and is thus shown to be a mixture of vinylacetylene (31% of the theory), chloroprene (12.5% of the theory), and unchanged chloro-4-butadiene-1,2.

One mol of chloro-4-butadiene-1,2 was added to one mol of sodium butylate in 400 cc. of butyl alcohol during one hour, and the mixture was then refluxed for 2 hours. The volatile product which escaped through the vertical condenser was caught in a cold receiver. On redistillation it gave 75% of the theoretical amount of vinylacetylene and a small fraction boiling at 20–25° C. This had the nauseating odor and poisonous properties ascribed to butatriene, and within 15 minutes at room temperature it had polymerized to an opaque solid.

The reactions above described produce new compounds never before described in the literature. They may be used in the synthesis of new compounds. Thus 2,3-butadienyl alcohol (hydroxy-4-butadiene-1,2) is a starting point for a whole new series of compounds as is shown in Example 1. The mercaptan may be used to prepare sulphonic acid. Butatriene readily polymerizes and may be used as a cross-linking agent in other polymerizations. The mercaptans may be polymerized to give soluble resins. Some of the new compounds are physiologically active and are, therefore, useful as pharmaceutical ingredients.

In addition to the use of chloro-4-butadiene-1,2 in the reactions described above, the invention is intended to include also the use of other hologen-4-butadienes-1,2 e. g., bromo-4-butadiene-1,2.

The above description and examples are intended to be construed as illustrative only. Any modification or variation thereof which conforms to the spirit of the invention is intended to be included within the scope of the claims.

We claim:

1. The process which comprises reacting halogen-4-butadiene-1,2 with an alkaline reacting metal inorganic compound of the group consisting of carbonates, oxides, hydrosulfides, and hydroxides.

2. The process which comprises reacting chloro-4-butadiene-1,2 with an alkaline reacting metal inorganic compound of the group consisting of carbonates, oxides, hydrosulfides, and hydroxides.

3. The process which comprises reacting chloro-4-butadiene-1,2 with an alkaline reacting metal carbonate.

4. The process which comprises reacting chloro-4-butadiene-1,2, with an alkaline reacting metal hydroxide.

5. The process which comprises reacting chloro-4-butadiene-1,2 with an alkaline reacting metal hydrosulfide.

6. A four carbon compound having at least two sets of carbon to carbon double bonds obtainable by the process of claim 2.

7. A compound of the formula
$CH_2=C=CH-CH_2(OH)$.

8. A compound of the formula
$CH_2=C=C=CH_2$.

9. A compound of the formula
$CH_2=C=CH-CH_2-SH$.

WALLACE H. CAROTHERS.
GERALD J. BERCHET.

Certificate of Correction

Patent No. 2,136,178.                                                                 November 8, 1938.

WALLACE H. CAROTHERS ET AL.

It is hereby certified that errors appear in the printed specification of the above numbered patent requiring correction as follows: Page 1, first column, line 33, Example A, for "85–95° C." read *80–95° C.*; page 2, first column, line 43, for "CHl" read *HCl*; and second column, line 54, in the formula, for "CH$_2$—OH" read *CH$_2$OH*; line 58, for the formula "CH$_3$≡C═C—CH$_2$OH" read *CH$_3$—C≡C—CH$_2$OH*; line 74, for "100 cc." read *1000 cc.*; page 3, first column, line 30, before "CH$_2$" at the beginning of the formula insert a parenthesis; and second column, line 24, for "hologen" read *halogen*; and that the said Letters Patent should be read with these corrections therein that the same may conform to the record of the case in the Patent Office.

Signed and sealed this 20th day of December, A. D. 1938.

[SEAL]

Henry Van Arsdale
*Acting Commissioner of Patents.*